(12) United States Patent
Kawach et al.

(10) Patent No.: US 10,218,682 B1
(45) Date of Patent: Feb. 26, 2019

(54) SECURE NETWORK PROTOCOL CRYPTOGRAPHIC PROCESSING

(71) Applicant: Amazon Technologies, Inc., Seattle, WA (US)

(72) Inventors: Rami Kawach, Bellevue, WA (US); Jesper Mikael Johansson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 302 days.

(21) Appl. No.: 15/001,077

(22) Filed: Jan. 19, 2016

(51) Int. Cl.
*H04L 29/06* (2006.01)
*G06F 21/60* (2013.01)
*H04L 9/32* (2006.01)

(52) U.S. Cl.
CPC ........ *H04L 63/0428* (2013.01); *G06F 21/602* (2013.01); *H04L 9/3268* (2013.01); *H04L 63/0435* (2013.01); *H04L 63/08* (2013.01); *H04L 63/166* (2013.01)

(58) Field of Classification Search
None
See application file for complete search history.

(56) References Cited

U.S. PATENT DOCUMENTS

| | | | | |
|---|---|---|---|---|
| 2003/0023845 A1* | 1/2003 | VanHeyningen | ..... | H04L 9/0643 713/151 |
| 2003/0200202 A1* | 10/2003 | Hsiao | ........... | G06F 21/6218 |
| 2008/0056494 A1* | 3/2008 | Jacobson | ........... | H04L 63/166 380/255 |
| 2013/0031356 A1* | 1/2013 | Prince | ........... | H04L 63/0823 713/151 |
| 2015/0288514 A1* | 10/2015 | Pahl | ........... | H04L 9/085 713/171 |

(Continued)

OTHER PUBLICATIONS

Rescorla, E., "TLS Elliptic Curve Cipher Suites with SHA-256/384 and AES Galois Counter Mode (GCM)," Request for Comments: 5289, Informational, Aug. 2008, 7 pages.

(Continued)

*Primary Examiner* — Eleni A Shiferaw
*Assistant Examiner* — Andrew J Steinle
(74) *Attorney, Agent, or Firm* — Davis Wright Tremaine LLP

(57) ABSTRACT

The present document describes systems and methods that utilize a cryptographic service for establishing a cryptographically protected communication session, such as a TLS connection, between a client computer system and a TLS termination point. The cryptographic service retains cryptographic material associated with a server that is represented by the TLS termination point. The TLS termination point uses the cryptographic service to perform cryptographic operations associated with establishing and maintaining the cryptographically protected communication session. The cryptographic service may be provided by the server itself, a cryptographic server, or a cryptographic accelerator such as an HSM. In some embodiments, the cryptographic service tokenizes unencrypted data to be provided to the TLS termination point. If a cryptographic accelerator is used, the cryptographic accelerator may include facilities to accelerate asymmetric cryptographic operations as well as symmetric cryptographic operations.

20 Claims, 10 Drawing Sheets

(56) References Cited

U.S. PATENT DOCUMENTS

2016/0173288 A1* 6/2016 Li ............................ G06F 11/30
                                                                713/168
2017/0262546 A1* 9/2017 Chen ................ G06F 17/30867

OTHER PUBLICATIONS

Igoe, K., and J. Solinas, "AES Galois Counter Mode for the Secure Shell Transport Layer Protocol," Request for Comments: 5647, Informational, Aug. 2009, 10 pages.
Stebiula, D., and J. Green, "Elliptic Curve Algorithm Integration in the Secure Shell Transport Layer," Request for Comments: 5656, Standards Track, Dec. 2009, 19 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, E., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Igoe, K., and D. Stebila, "X.509v3 Certificates for Secure Shell Authentication," Request for Comments: 6187, Standards Track, Mar. 2011, 17 pages.
Kim, W., et al., "Addition of the ARIA Cipher Suites to Transport Layer Security (TLS)," Request for Comments: 6209, Informational, Apr. 2011, 10 pages.
Igoe, K., "Suite B Cryptographic Suites for Secure Shell (SSH)," Request for Comments: 6239, Informational, May 2011, 15 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.
McGrew, D., and D. Bailey, "AES-CCM Cipher Suites for Transport Layer Security (TLS)," Request for Comments: 6655, Standards Track, Jul. 2012, 8 pages.
Bider, D., and M. Baushke, "SHA-2 Data Integrity Verification for the Secure Shell (SSH) Transport Layer Protocol," Request for Comments: 6668, Standards Track, Jul. 2012, 6 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.
"Proxy Server," Wikipedia, The Free Encyclopedia, Jan. 14, 2015, <https://en.wikipedia.org/wiki/Proxy_server> [retrieved Jan. 15, 2016], 10 pages.
Atkinson, R., "Security Architecture for the Internet Protocol," Request for Comments: 1825, Standards Track, Aug. 1995, 23 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.
Karn, P., et al., "The ESP DES-CBC Transform," Request for Comments: 1829, Standards Track, Aug. 1995, 11 pages.
Dierks, T., et al., "The TLS Protocol Version 1.0," Request for Comments: 2246, Standards Track, Jan. 1999, 75 pages.
Kent, S., "Security Architecture for the Internet Protocol," Request for Comments: 2401, Standards Track, Nov. 1998, 62 pages.
Orman, H., "The OAKLEY Key Determination Protocol," Request for Comments: 2412, Informational, Nov. 1998, 56 pages.
Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Lee, H.J., et al., "Addition of Seed Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Lehtinen, S., and C. Lonvick, "The Secure Shell (SSH) Protocol Assigned Numbers," Request for Comments: 4250, Standards Track, Jan. 2006, 19 pages.
Ylonen, T., and C. Lonvick, "The Secure Shell (SSH) Protocol Architecture," Request for Comments: 4251, Standards Track, Jan. 2006, 28 pages.
Ylonen, T., and C. Lonvick, "The Secure Shell (SSH) Authentication Protocol," Request for Comments: 4252, Standards Track, Jan. 2006, 16 pages.
Ylonen, T., and C. Lonvick, "The Secure Shell (SSH) Transport Layer Protocol," Request for Comments: 4253, Standards Track, Jan. 2006, 30 pages.
Ylonen, T., and C. Lonvick, "The Secure Shell (SSH) Connection Protocol," Request for Comments: 4254, Standards Track, Jan. 2006, 23 pages.
Schlyter, J., and W. Griffin, "Using DNS to Securely Publish Secure Shell (SSH) Key Fingerprints," Request for comments: 4255, Standards Track, Jan. 2006, 9 pages.
Cusack, F., and M. Forssen, "Generic Message Exchange Authentication for the Secure Shell Protocol (SSH)," Request for Comments: 4256, Standards Track, Jan. 2006, 12 pages.

(56) References Cited

OTHER PUBLICATIONS

Eronen, P., and H. Tschofenig, "Pre-Shared Key Ciphersuites for Transport Layer Security (TLS)," Request for comments: 4279, Standards Track, Dec. 2005, 16 pages.

Kent, S., and K. Seo, "Security Architecture for the Internet Protocol," Request for Comments: 4301, Standards Track, Dec. 2005, 102 pages.

Kent, S., "IP Encapsulating Security Payload (ESP)," Request for Comments: 4303, Standards Track, Dec. 2005, 45 pages.

Housley, R., "Using Advanced Encryption Standard (AES) CCM Mode With IPsec Encapsulating Security Payload (ESP)," Request for Comments: 4309, Standards Track, Dec. 2005, 14 pages.

Galbraith, J., and P. Remaker, "The Secure Shell (SSH) Session Channel Break Extension," Request for comments: 4335, Standards Track, Jan. 2006, 6 pages.

Bellare, M., et al., "The Secure Shell (SSH) Transport Layer Encryption Modes," Request for Comments: 4344, Standards Track, Jan. 2006, 12 pages.

Harris, B., "Improved Arcfour Modes for the Secure Shell (SSH) Transport Layer Protocol," Request for Comments: 4345, Standards Track, Jan. 2006, 5 pages.

Rescorla, E., and N. Modadugu, "Datagram Transport Layer Security," Request for Comments: 4347, Standards Track, Apr. 2006, 26 pages.

Blake-Wilson, S., et al., "Transport Layer Security (TLS) Extensions," Request for Comments: 4366, Standards Track, Apr. 2006, 29 pages.

Friedl, M., et al., "Diffie-Hellman Group Exchange for the Secure Shell (SSH) Transport Layer Protocol," Request for comments: 4419, Standards Track, Mar. 2006, 10 pages.

Harris, B., "RSA Key Exchange for the Secure Shell (SSH) Transport Layer Protocol," Request for Comments: 4432, Standards Track, Mar. 2006, 8 pages.

Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.

Blake-Wilson, S., et al., "Elliptic Curve Cryptography (ECC) Cipher Suites for Transport Layer Security (TLS)," Request for Comments: 4492, Informational, May 2006, 36 pages.

Santesson, S., "TLS Handshake Message for Supplemental Data," Request for Comments: 4680, Standards Track, Sep. 2006, 10 pages.

Santesson, S., et al., "TLS User Mapping Extension," Request for Comments: 4681, Standards Track, Dctober 2006, 11 pages.

Galbraith, J. and R. Thayer, "The Secure Shell (SSH) Public Key File Format," Request for Comments: 4716, Nov. 2006, 11 pages.

Blumenthal, U., and P. Goel, "Pre-Shared Key (PSK) Ciphersuites with Null Encryption for Transport Layer Security (TLS)," Request for Comments: 4785, Standards Track, Jan. 2007, 6 pages.

Galbraith, J., et al., "Secure Shell Public Key Subsystem," Request for Comments: 4819, Standards Track, Mar. 2007, 18 pages.

Taylor, D., et al., "Using the Secure Remote Password (SRP) Protocol for Tls Authentication," Request for Comments: 5054, Informational, Nov. 2007, 25 pages.

Salowey, J., et al., "Transport Layer Security (TLS) Session Resumption without Server-Side State," Request for Comments: 5077, Standards Track, Jan. 2008, 21 pages.

Mavrogiannopoulos, N., "Using OpenPGP Keys for Transport Layer Security (TLS) Authentication," Request for Comments: 5081, Experimental, Nov. 2007, 9 pages.

Phelan, T., "Datagram Transport Layer Security (DTLS) over the Datagram Congestion Control Protocol (DCCP)," Request for Comments: 5238, Standards Track, May 2008, 11 pages.

Dierks, T., and E. Rescorla, "The Transport Layer Security (TLS) Protocol Version 1.2," Request for Comments: 5246, Standards Track, Aug. 2008, 98 pages.

Salowey, J., et al., "AES Galois Counter Mode (GCM) Cipher Suites for TLS," Request for Comments: 5288, Standards Track, Aug. 2008, 9 pages.

\* cited by examiner

US 10,218,682 B1

SECURE NETWORK PROTOCOL CRYPTOGRAPHIC PROCESSING

BACKGROUND

When a client accesses a service from a client computer system, the client computer system establishes a communication link from the client computer system to a content server operated by a service provider. The content server is generally located in a data center operated by a service provider. The communication link can be established using one or more logical network connections. In some environments, the communication link between the client computer system and the content server is established as a single logical connection. But as the size and complexity of the service increases, this is not always practical or desirable. For example, a number of content servers may be used by the service provider to provide increased service capacity, and a TLS termination point such as a proxy may be placed between the content servers and clients. Service requests are sent from client computer system to the TLS termination point, and the TLS termination point distributes the service requests to the content servers based on server workload, resource matching, or other priorities.

The presence of load-balancing proxies, firewalls, or other intermediate network entities in the communication link between the client and the content server may complicate the use of secure transport protocols, such as transport layer security ("TLS"), or other protocols that use endpoint authentication. In the case of TLS, a communication link between the client computer system and the content server via an intermediate TLS termination point includes a first TLS connection between the client computer system and the TLS termination point, and a second logical connection (using TLS or another protocol), between the TLS termination point and the content server. When the first TLS connection is established, the TLS termination point provides a digital certificate belonging to the content server to the client computer system. In addition, the TLS termination point uses a private key associated with the digital certificate to exchange a master secret with the client computer system. To facilitate this, proxies (and other entities that terminate TLS/SSL connections on behalf of other entities such as content delivery networks ("CDNs"), Web application firewalls ("WAFs"), and distributed denial of service ("DDoS") Protection services) retain a copy of the content server's digital certificate and private key on the TLS termination point. Securely maintaining digital certificates and private keys on intermediate entities is a difficult and challenging problem for service providers.

BRIEF DESCRIPTION OF THE DRAWINGS

Various techniques will be described with reference to the drawings, in which.

DETAILED DESCRIPTION

Figure 1:
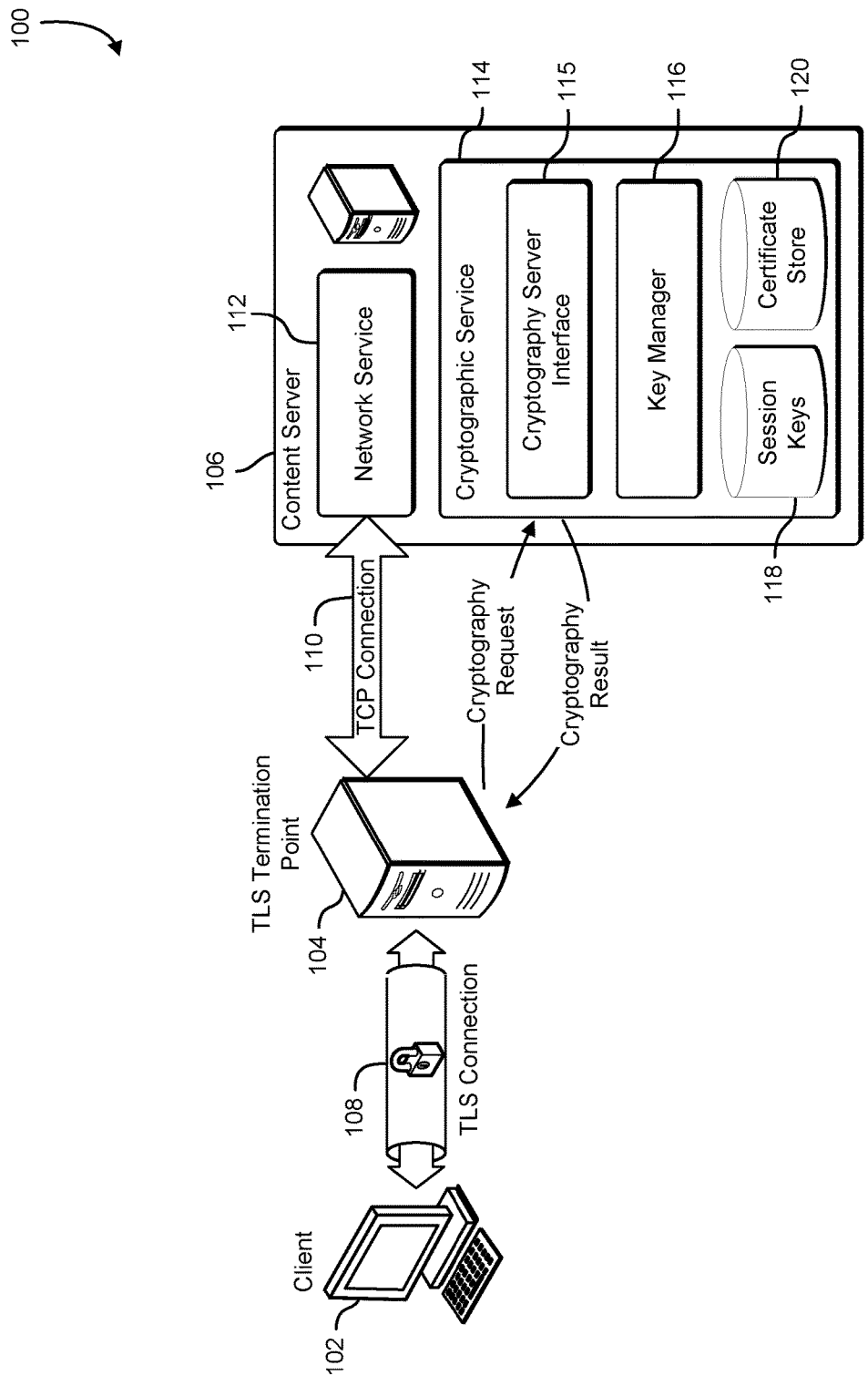
FIG. 1 shows an illustrative example of an environment in which various embodiments may be practiced.

The current document describes systems and methods that manage cryptographic keys that are used to establish cryptographically protected communication sessions. When a cryptographically protected communication session, such as a transport layer security ("TLS") connection is established between a client and a content server, the client and the content server can use digital certificates to confirm their identities and to exchange shared-secret information used to secure the connection. The digital certificates include public cryptographic keys that are associated with corresponding private cryptographic keys. In general, the private cryptographic keys are closely held by the corresponding certificate owner.

In some data center configurations, service providers use a TLS termination point such as a proxy server to act as an intermediary between client computer systems outside the data center, and content servers within the data center. Service requests are received from the client computer systems by the TLS termination point, which processes, routes, or filters the requests on behalf of one or more of the content servers within the data center. In many cases, the TLS termination point relays the requests to one or more of the content servers which handle the requests. TLS termination points may perform a variety of functions on behalf of the content servers such as load-balancing, firewall security, and defense against denial of service attacks. In some implementations, TLS termination points accept and terminate logical connections initiated by the client computer systems on behalf of the content servers within the data center. For example, if a client computer system uses a secure network protocol such as TLS to initiate a connection, the TLS termination point acts as a termination point for the incoming TLS connection. Information received over the incoming TLS connection is relayed to a destination content server within the data center using a separate connection, which may or may not use a secure protocol. In order to establish the incoming TLS connection, the TLS termination point accepts the TLS connection on behalf of a content server within the data center using the content server's digital certificate, and if necessary, encrypts and decrypts data using the private key associated with the content server's digital certificate.

Providing the TLS termination point with secure access to the digital certificates and the private cryptographic keys of the content servers is a difficult problem. In general, the TLS termination point is more accessible to potential attackers than the content servers that provide the services, so it is desirable to avoid storing the digital certificates and especially the private cryptographic keys directly on the TLS termination point. When a client computer system initiates a TLS connection to a service provided by a content server within the data center, the TLS termination point, acting on behalf of the content server, performs a TLS handshake with the client computer system. As part of the TLS handshake, the TLS termination point provides, to the client computer system, a digital certificate associated with the content server. The digital certificate includes a public cryptographic key. The client computer system encrypts a premaster secret using the public cryptographic key and provides the encrypted premaster secret to the TLS termination point.

The TLS termination point does not rely on a locally retained copy of the content server's private cryptographic key for decrypting the premaster secret. Instead, the TLS termination point accesses a cryptographic service provided by the service provider. The cryptographic service maintains the digital certificates and the private cryptographic keys for the content servers within the data center. In some implementations, the cryptographic service is provided by the content server itself for the purpose of performing cryptographic operations for the TLS termination point. In another implementation, the cryptographic service is provided by a cryptographic server separate from the content server that provides the service. In yet another implementation, the cryptographic service is provided in the form of a cryptographic accelerator that performs both asymmetric and symmetric cryptographic operations for the TLS termination point. Once the cryptographic service has decrypted the premaster secret for the TLS termination point, a session key for the TLS connection may be derived by the TLS termination point, and the session key is used to encrypt and decrypt data records exchanged between the client computer system and the TLS termination point.

In some embodiments, the cryptographic service performs both asymmetric and symmetric cryptographic operations associated with the TLS connection for the TLS termination point, eliminating the need for the TLS termination point to have access to the TLS session key. In such embodiments, the TLS termination point receives the encrypted premaster secret from the client computer system, and provides the encrypted premaster secret to the cryptographic service. The cryptographic service decrypts the encrypted premaster secret and, using additional information provided by the TLS termination point, generates a session key for the TLS session. The cryptographic service encrypts and decrypts TLS data records in response to requests from the TLS termination point, and in some examples, eliminates the need for the TLS termination point to maintain a copy of the session key. In some examples, the TLS termination point has processors that are adapted to performing asymmetric and/or symmetric cryptographic operations, thereby increasing the overall computing efficiency of the system as a whole.

In some implementations, the cryptographic service tokenizes data records associated with the TLS session to avoid providing unencrypted data on the TLS termination point. Encrypted data records received by the TLS termination point are provided to the cryptographic service. The cryptographic service decrypts the encrypted data records and retains the unencrypted data on the cryptographic service. A data token is returned to the TLS termination point by the cryptographic service. The TLS termination point provides the token to the content server, and the content server uses the data token to retrieve the unencrypted data from the cryptographic service. If the content server transmits data records to the client computer system via the TLS termination point, the content server sends the unencrypted data to the cryptographic service, and the cryptographic service retains the unencrypted data for later use by the TLS termination point. The cryptographic service provides a token to the content server that identifies the unencrypted data. Instead of providing the unencrypted data to the TLS termination point, the content server provides the token to the TLS termination point. The TLS termination point provides the identifier to the cryptographic service, and the cryptographic service returns a version of the corresponding data that is encrypted with the session key, and the TLS termination point sends the encrypted data to the client computer system.

FIG. 1 shows an illustrative example of an environment in which various embodiments may be practiced. A system diagram 100 includes a client computer system 102, a TLS termination point 104, and a content server computer system 106. The client computer system 102 and the TLS termination point 104 communicate via a TLS connection 108. The TLS termination point 104 acts as an endpoint for the TLS connection 108 on behalf of the content server computer system 106. The TLS termination point 104 and the content server computer system 106 communicate via a TCP connection 110. The TCP connection 110 can be a cryptographically protected connection such as a TLS connection or an unencrypted TCP/IP connection. In some embodiments, the TLS termination point 104 and the content server computer system 106 communicate via a TLS connection, and IPX connection, a VPN connection, or other connection-oriented network connection. The content server computer system 106 includes a network service 112 and a cryptographic service 114. The network service 112 provides functionality associated with providing an online service to the client computer system 102. In various examples, the network service 112 provides a storage service, a Web content service, a virtual computing service, or an email service. The cryptographic service 114 provides cryptographic functions to the TLS termination point 104. The cryptographic service 114 includes a cryptography server interface 115 and a key manager 116, and retains cryptographic information in one or more databases. In one implementation, a session database 118 retains symmetric encryption keys associated with TLS connections maintained by the TLS termination point 104. A certificate database 120 retains asymmetric cryptographic keys such as digital certificates and private keys associated with network services such as the network service 112. The cryptography server interface 115 provides a network service accessible by the TLS termination point 104. The network service accepts cryptography requests from the TLS termination point 104, authenticates the cryptography requests, and provides cryptographic results in response. The key manager 116 manages the use of cryptographic keys maintained by the cryptographic service 114, and processes cryptographic requests received by the cryptography server interface 115.

The cryptographic service 114 enables the TLS termination point 104 to establish and maintain the TLS connection 108 without requiring that the TLS termination point 104 have direct access to cryptographic keys associated with the network service 112. In one example, the client computer system 102 initiates a connection request to the network service 112. The connection request is intercepted by the TLS termination point 104 which processes the connection request on behalf of the network service 112. The client computer system 102 requests a digital certificate for the network service 112, and the TLS termination point 104 provides the digital certificate for the network service 112 to the client computer system 102. The digital certificate for the network service may be provided to the TLS termination point 104 by the network service 112 or via the cryptographic service 114. The client computer system 102 generates the premaster secret, and encrypts the premaster secret with a public key that is included in the digital certificate. The encrypted premaster secret is returned to the TLS termination point 104. Decrypting the premaster secret generally requires the private key associated with the digital certificate of the network service 112. Rather than providing the TLS termination point 104 with the private key, the TLS termination point 104 accesses the cryptographic service 114, and requests decryption of the encrypted premaster secret. The cryptography server interface 115 authenticates the cryptography request submitted by the TLS termination point 104. If the request is authorized, the cryptographic service 114 decrypts the premaster secret for the TLS termination point 104.

In some implementations, the cryptographic service 114 provides the decrypted master secret to the TLS termination point 104, and the TLS termination point 104 uses the premaster secret to generate a session key for the TLS connection 108. The session key is retained by the TLS termination point 104 and used to encrypt and decrypt data records associated with the TLS connection 108.

In another implementation, the cryptographic service 114 is provided with additional connection-related information from the TLS termination point 104 (such as the exchanged random values that are part of the TLS handshake), and uses the premaster secret to generate a session key for the TLS connection 108. The premaster secret and session key are retained by the cryptographic service 114. The cryptographic service 114 returns a connection token to the TLS termination point 104 which can be used to perform cryptographic operations with the retained keys. The TLS termination point 104 encrypts and decrypts data records for the TLS connection 108 using the cryptographic service 114.

Figure 2:
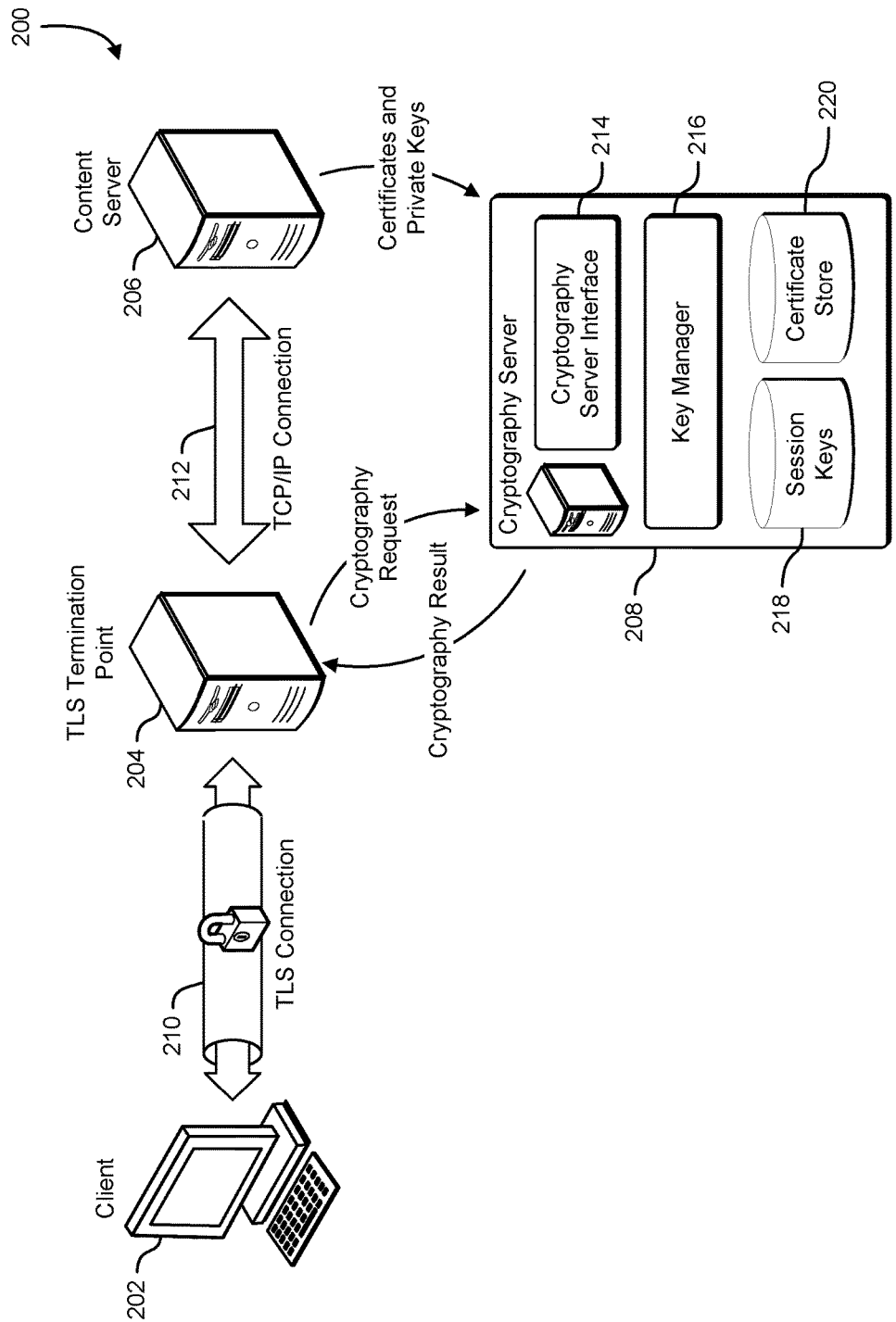
FIG. 2 shows an illustrative example of a TLS termination point that uses a cryptography service to establish cryptographically protected communication sessions, in accordance with an embodiment.

FIG. 2 shows an illustrative example of a TLS termination point that uses a cryptography service to establish cryptographically protected communication sessions, in accordance with an embodiment. A system diagram 200 includes a client computer system 202, a TLS termination point 204, a content server computer system 206, and a cryptography server 208. The client computer system 202 communicates with an online service provided by the content server computer system 206 via a TLS termination point 204. The communication between a client computer system 202 and the content server computer system 206 occurs via TLS connection 210 and a TCP/IP connection 212. The TLS termination point 204 acts on behalf of the content server computer system 206 to establish and maintain the TLS connection 210. The content server computer system 206 provides digital certificates and private cryptographic keys to the cryptography server 208. Cryptographic operations associated with establishing and maintaining the TLS connection 210 are performed by the cryptography server 208 at the direction of the TLS termination point 204. The cryptography server 208 includes a cryptography server interface 214 and a key manager 216. The cryptography server interface 214 provides a cryptographic service that is accessible to the TLS termination point 204. The key manager 216 manages cryptographic keys associated with the TLS connection 210 and the content server computer system 206. Session keys information associated with the TLS connection 210 are retained in a session database 218, and digital certificates and private cryptographic keys associated with the content server computer system 206 are retained in a certificate store 220.

In some examples, the client computer system 202 initiates a TLS connection to an online service provided by the content server computer system 206. The TLS termination point 204 accepts the TLS connection request on behalf of the content server computer system 206, and provides the client computer system 202 with the digital certificate associated with the content server computer system 206. The TLS termination point 204 may acquire the digital certificate from the content server computer system 206 or the cryptography server 208. In some implementations, the TLS termination point 204 retains a copy of the digital certificate. The client computer system 202 and the TLS termination point 204 exchange various information during the TLS handshake, and the client computer system 202 generates the premaster secret. The premaster secret is encrypted using a public cryptographic key associated with the digital certificate of the content server computer system 206. The encrypted premaster secret is transmitted to the TLS termination point 204. The TLS termination point 204 sends the encrypted premaster secret to the cryptography server 208 and requests that the encrypted premaster secret be decrypted using the private key of the content server computer system 206. The cryptography server interface 214 authorizes the request, and forwards the request of the key manager 216. The key manager 216 accesses the private cryptographic key of the content server computer system 206 from the certificate store 220, and decrypts the encrypted premaster secret. In some implementations, the decrypted premaster secret is provided to the TLS termination point 204 by the cryptography server 208. In other implementations, the decrypted premaster secret is retained by the cryptography server 208, and the cryptography server 208 generates a session key for the TLS connection. The session key may be provided by the cryptography server to the TLS termination point 204, or alternatively the session key may be retained by the cryptography server and used to perform symmetric cryptographic operations for the TLS termination point 204 that are associated with the TLS connection 210.

Once the TLS connection 210 is established, encrypted data records may be exchanged between the client computer system 202 and the TLS termination point 204 using symmetric encryption. The symmetric encryption utilizes a session key that may be stored on the TLS termination point 204 or retained by the cryptography server 208. If the session key is retained by the cryptography server 208, cryptographic operations associated with encrypting and decrypting data records may be performed by the cryptography server for the TLS termination point 204. Data transmitted from the content server computer system 206 to the TLS termination point 204 can be encrypted by the TLS termination point 204 or may be relayed from the TLS termination point 204 to the cryptography server 208 and encrypted by the cryptography server 208. The encrypted data is then transmitted to the client computer system via the TLS connection 210. Encrypted data records received by the TLS termination point 204 from the client computer system 202 by the TLS connection 210 may be encrypted by the TLS termination point 204 or the cryptography server 208. The decrypted data records are forwarded from the TLS termination point 204 to the content server computer system 206.

The cryptography server 208 may be implemented using a hardware security module ("HSM"). The HSM may be used to retain, in unexportable storage, cryptographic keys associated with the online service, and a cryptoprocessor on the HSM used to implement the cryptographic service. Information may be programmatically unexportable if there is no legitimate way to programmatically cause, through an interface of the device, the device to provide the information. The information may be maintained such that there is no request mechanism (e.g., application programming interface (API) call) for causing the device to reveal the information in plaintext form. A device that retains the information (e.g., cryptographic module or HSM) may lack an ability to provide a copy of some or all of its memory where the copy includes the information in plaintext form. Some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form. A cryptoprocessor includes one or more features for enhancing the security of data on which the cryptoprocessor operates. In various implementations a cryptoprocessor may include tamper-resistant or tamper-detecting packaging, conductive shielding, code authentication mechanisms, and device reset mechanisms that destroy sensitive information if tampering is detected.

Figure 3:
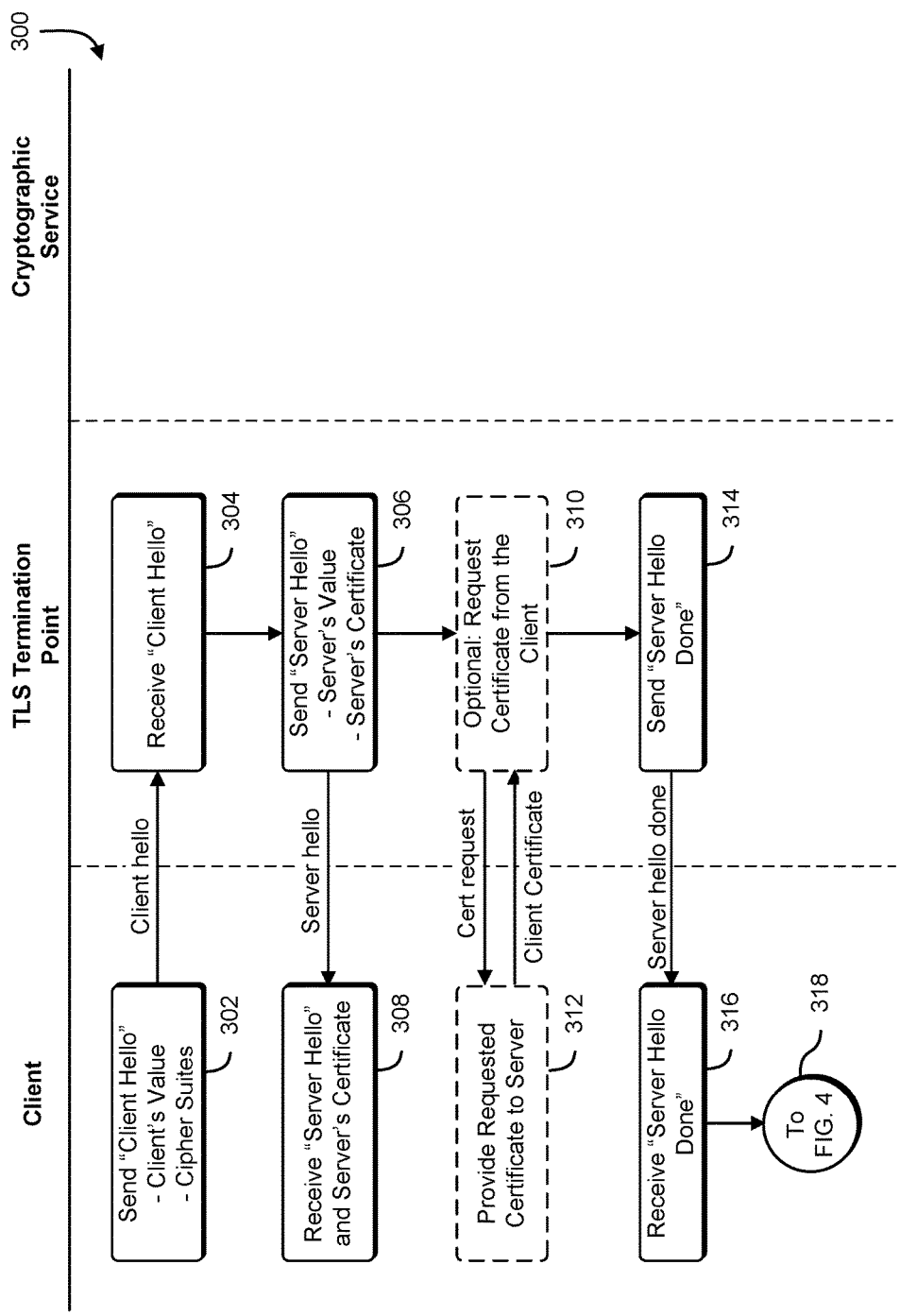
FIG. 3 shows a first portion of an illustrative example of a process that, as a result of being performed by a client computer system, a TLS termination point, and a cryptographic service, establishes a cryptographically protected communication session between the client computer system and the TLS termination point, in accordance with an embodiment.

FIG. 3 shows a first portion of an illustrative example of a process that, as a result of being performed by a client computer system, a TLS termination point, and a cryptographic service, establishes a cryptographically protected communication session between the client computer system and the TLS termination point, in accordance with an embodiment. A swim diagram 300 shows a process that begins at block 302 with the client computer system sending a "client hello" message to the TLS termination point. The "client hello" message includes a random or pseudorandom value generated by the client, and the list of cipher suites supported by the client. The TLS termination point, as a result of receiving 304 the "client hello" message, sends 306 a "server hello" message to the client computer system. The "server hello" message includes a random or pseudorandom value generated by the TLS termination point and a digital certificate associated with an online service being accessed by the client computer system. The TLS termination point may be provided with a copy of the digital certificate by the online service provider, or may acquire the digital certificate from the cryptographic service. At block 308, the client computer system receives the "server hello" message and the digital certificate for the online service. The client computer system validates the digital certificate to confirm that the TLS termination point is acting on behalf of the online service.

In some implementations, the TLS termination point may confirm the identity of the client. At block 310, the TLS termination point optionally requests a digital certificate from the client. The client computer system receives the request and provides 312 the digital certificate associated with the client computer system to the TLS termination point. The TLS termination point validates the digital certificate to confirm the identity of the client computer system.

At block 314, the TLS termination point sends a "server hello done" message to the client computer system. The client computer system receives 316 the "server hello done" message, and the exchange of digital certificates is complete. Connection Circle 318 indicates that the process illustrated in FIG. 3 continues at a corresponding connection Circle on FIG. 4.

Figure 4:
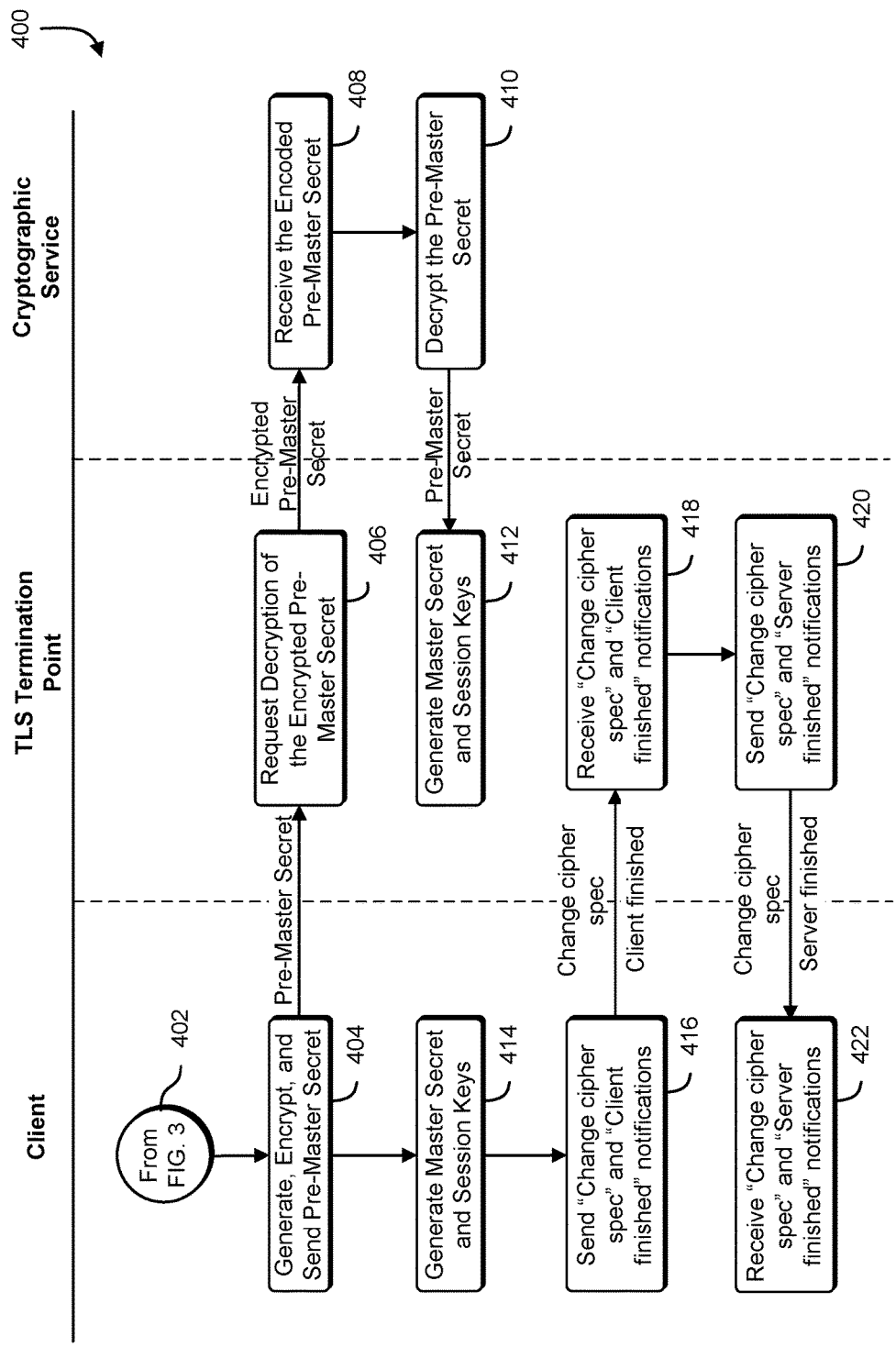
FIG. 4 shows a second portion of an illustrative example of a process that, as a result of being performed by a client computer system, a TLS termination point, and a cryptographic service, establishes a cryptographically protected communication session between the client computer system and the TLS termination point, in accordance with an embodiment.

FIG. 4 shows a second portion of an illustrative example of a process that, as a result of being performed by a client computer system, a TLS termination point, and a cryptographic service, establishes a cryptographically protected communication session between the client computer system and the TLS termination point, in accordance with an embodiment. A swim diagram 400 illustrates a process that begins at a connection Circle 402. The connection Circle 402 links to a first portion of the illustrated process shown in FIG. 3. At block 404, the client computer system generates a premaster secret. The premaster secret may be based at least in part on the randomly or pseudorandomly generated values exchanged by the client computer system and the TLS termination point. The premaster secret is encrypted using the public key of the online service. The public key of the online service is contained within the digital certificate provided by the TLS termination point. At block 406, the TLS termination point receives the encrypted premaster secret. To decrypt the premaster secret, the TLS termination point sends a request for decryption to the cryptographic service. The cryptographic service receives 408 encrypted premaster secret. If the TLS termination point is authorized to perform cryptographic operations with the online services private cryptographic key, the cryptographic service decrypts 410 the encrypted premaster secret to produce a decrypted premaster secret. The decrypted premaster secret is provided to the TLS termination point, and the TLS termination point generates 412 a master secret and session keys to be used with the secure connection. The client computer system retains the premaster secret, and uses the premaster secret to generate 414 a matching master secret and matching session keys for the secure connection.

At block 416, the client computer system sends a "change cipher spec" and "client finished" notification to the TLS termination point, indicating a particular cipher spec that will be used by the client for future communications. At block 418, the TLS termination point receives the selected cipher spec, and responds by sending 420 a corresponding "change cipher spec" and "server finished" notification. At block 422, the client computer system receives server's "change cipher spec" and "server finished" notifications, and the secure connection is established. Additional communications occur using the negotiated session keys and the cipher spec agreed to by the client computer system and the TLS termination point.

Figure 5:
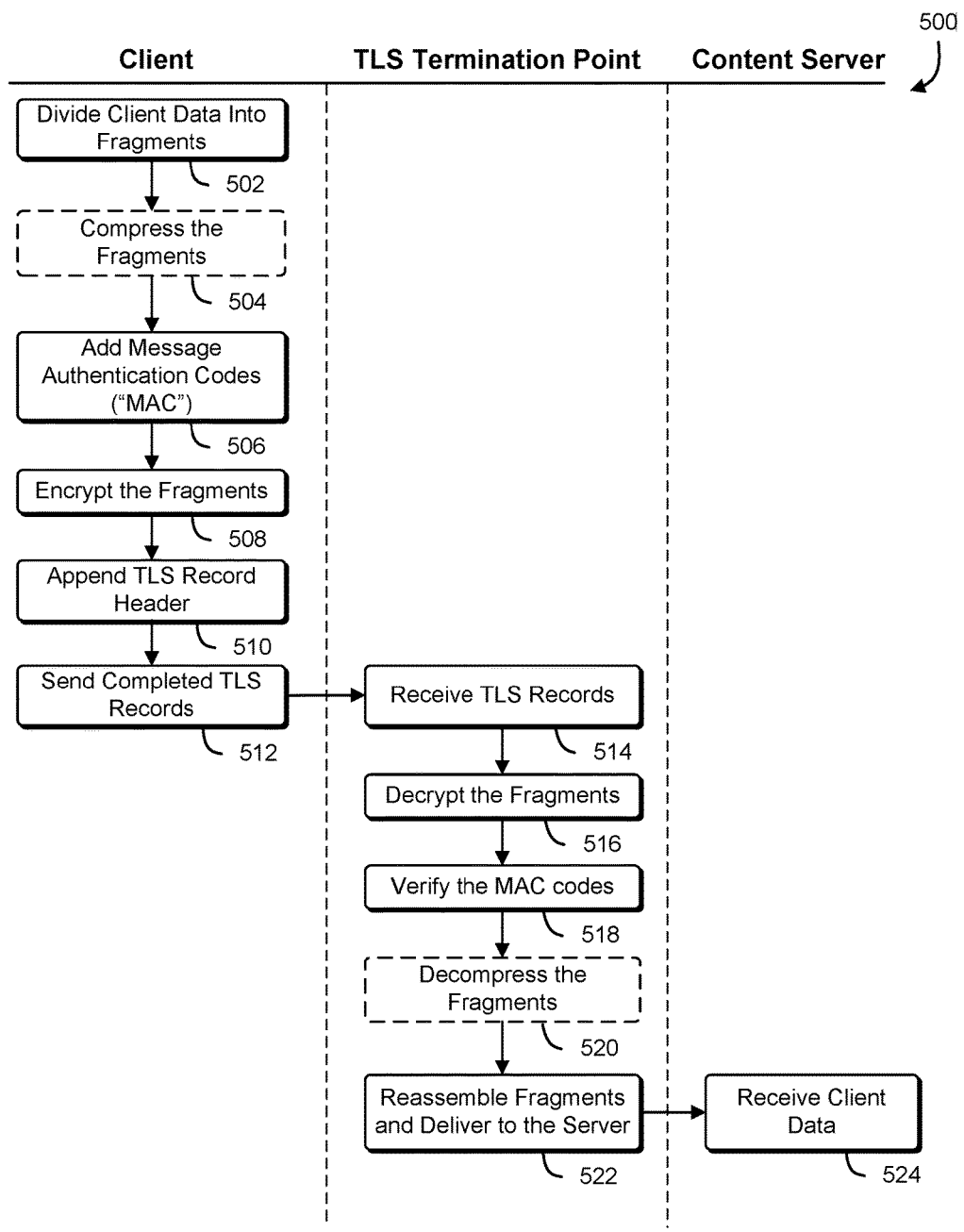
FIG. 5 shows an illustrative example of a process that, as a result of being performed by a client computer system, a TLS termination point, and a content server, transfers data from the client computer system to the content server via a cryptographically protected communication session between the client computer system and the TLS termination point, in accordance with an embodiment.

FIG. 5 shows an illustrative example of a process that, as a result of being performed by a client computer system, a TLS termination point, and a content server, transfers data from the client computer system to the content server via a cryptographically protected communication session between the client computer system and the TLS termination point, in accordance with an embodiment. A swim diagram 500 illustrates a process that begins at block 502 with a client computer system dividing client data into a number of data fragments. In some implementations, at block 504, the client computer system optionally compresses the data fragments. The client computer system adds 506 message authentication codes to the data fragments. Message authentication codes help to protect the message content from alteration or corruption. At block 508, the client computer system encrypts the fragments using a symmetric encryption algorithm and the shared session keys negotiated during the handshake process. The client computer system appends 510 the TLS record header, and sends 512 the completed TLS records to the TLS termination point.

At block 514, the TLS termination point receives the TLS records from the client computer system. The TLS termination point decrypts 516 the encrypted records using the session keys negotiated during the handshake process, and verifies 518 the message authentication codes to help ensure that message content has not been altered or corrupted. In some implementations, at block 520, if the data fragments were compressed by the client computer system, the decrypted data fragments are decompressed by the TLS termination point. The TLS termination point reassembles 522 to the data fragments and provides the reassembled data to the content server. At block 524, the content server receives the client data.

If the content server sends data to the client computer system, a corresponding process is performed. The content server sends content server data to the TLS termination point, and the TLS termination point divides the content server data into fragments, and optionally compresses the fragments. Message authentication codes are added by the TLS termination point and the fragments are encrypted using the session key negotiated between the client and the TLS termination point. A TLS record header is appended to the fragments and the fragments are transmitted from the TLS termination point to the client computer system. As a result of receiving the fragments, the client computer system decrypts the fragments using the session key, verifies the Mac codes, and optionally decompresses the fragments if necessary. The client computer system reassembles the fragments to recover the content server's data.

Figure 6:
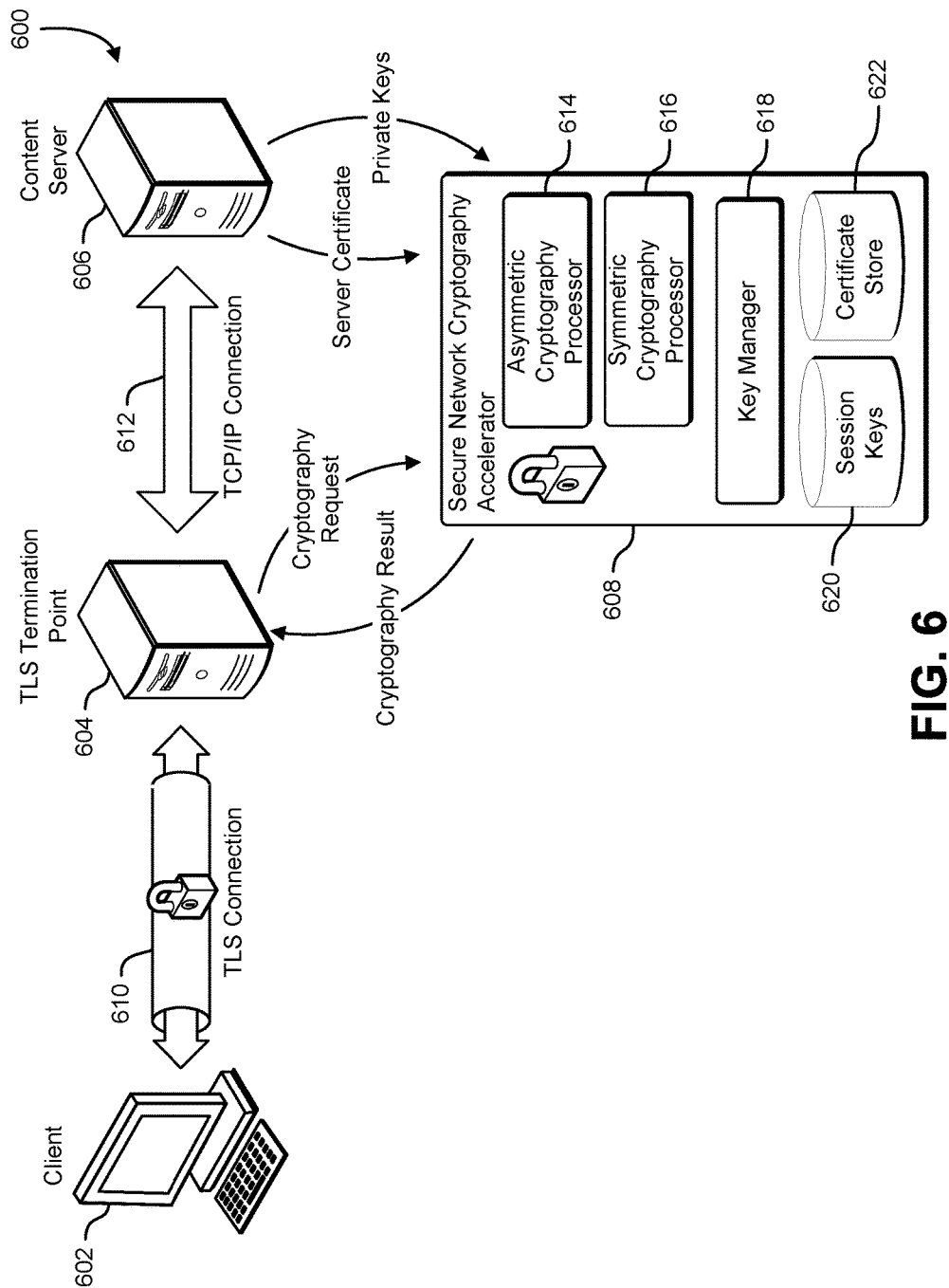
FIG. 6 shows an illustrative example of a TLS termination point that uses a cryptography accelerator to establish cryptographically protected communication sessions, in accordance with an embodiment.

FIG. 6 shows an illustrative example of a TLS termination point that uses a cryptography accelerator to establish cryptographically protected communication sessions, in accordance with an embodiment. A system diagram 600 shows a system that includes a client computer system 602 a TLS termination point 604 a content server computer system 606 and a secure network cryptography accelerator 608. The client computer system 602 and the TLS termination point 604 communicate via a secure connection 610 such as a TLS connection. The TLS termination point 604 and the content server computer system 606 communicate via a TCP/IP connection 612.

The content server computer system 606 provides the secure network cryptography accelerator 608 with a digital certificate and private cryptographic keys which are associated with the content server computer system 606. The TLS termination point 604 uses the secure network cryptography accelerator 608 to perform cryptographic operations associated with the establishment and maintenance of the secure connection 610. The secure network cryptography accelerator 608 may be implemented as a set of software services on a general purpose computer system, or using a secure computing platform such as a hardware security module ("HSM"). The secure network cryptography accelerator 608 includes an asymmetric cryptography processor 614, and in some implementations, a symmetric cryptography processor 616. The asymmetric cryptography processor 614 is a processor, digital signal processor ("DSP"), or crypto processor, that is configured to perform asymmetric cryptography functions such as creating and verifying digital signatures that are based on asymmetric cryptographic key pairs. The symmetric cryptography processor 616 is configured to perform symmetric cryptography functions such as those used to encode data records exchanged over a TLS connection. The key manager 618 manages access to digital certificates and cryptographic keys provided by the content server computer system 606. The key manager 618 maintains symmetric cryptographic keys at the session keys in a session key database 620 and asymmetric keys such as digital certificates and associated public-private key pairs in a certificate store 622.

The secure network cryptography accelerator 608 can be used to offload cryptographic operations from the TLS termination point 604 or other network appliances. For example, low-power wearable devices, small battery-powered peripherals, and low-cost devices may lack the computational horsepower to perform asymmetric cryptographic operations. Such devices can load their digital certificates and cryptographic keys on to the secure network cryptography accelerator 608, and use the secure network cryptography accelerator 608 to perform cryptographic operations. In this way, such devices can support secure cryptographic connections to outside servers.

Figure 7:
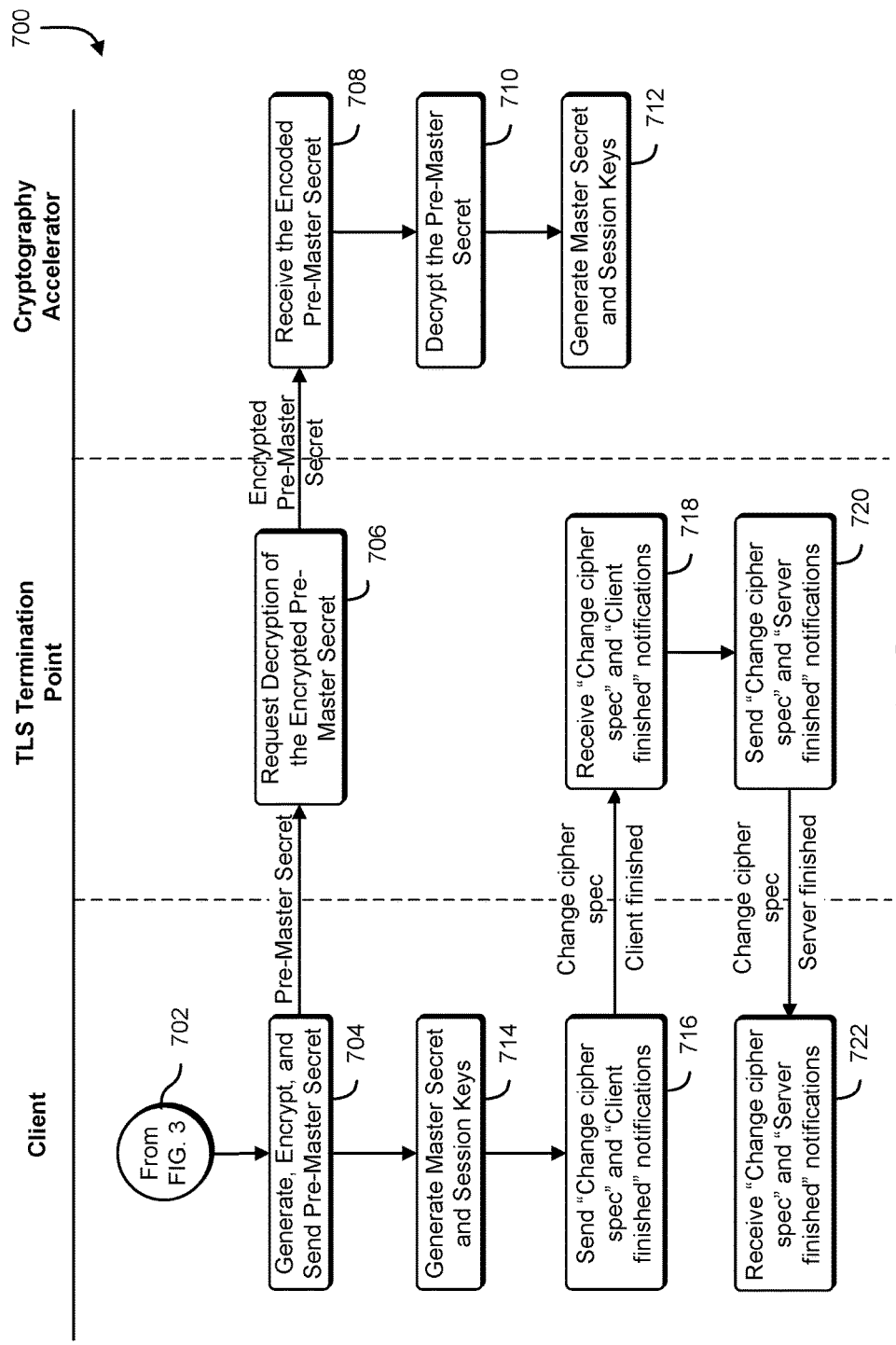
FIG. 7 shows a portion of an illustrative example of a process that, as a result of being performed by a client computer system, a TLS termination point, and a cryptographic accelerator, establishes a cryptographically protected communication session between the client computer system and the TLS termination point, in accordance with an embodiment.

FIG. 7 shows a portion of an illustrative example of a process that, as a result of being performed by a client computer system, a TLS termination point, and a cryptographic accelerator, establishes a cryptographically protected communication session between the client computer system and the TLS termination point, in accordance with an embodiment. A swim diagram 700 shows a second portion of a process that establishes a TLS connection. The first portion of the process is shown in FIG. 3, and the second portion of the process begins at a connection circle 702 from FIG. 3. At block 704, the client computer system generates a premaster secret based at least in part on information exchanged between the client computer system and the TLS termination point. The client computer system encrypts the premaster secret using a public cryptographic key contained in a digital certificate associated with an online service being accessed by the client computer system. The encrypted premaster secret is provided to the TLS termination point. The TLS termination point receives the encrypted premaster secret from the client computer system, and requests 706 decryption of the encrypted premaster secret from the cryptography accelerator.

The cryptography accelerator receives 708 the encoded premaster secret from the TLS termination point, along with a request to decode the encoded premaster secret using the private cryptographic key associated with the online service.

The cryptography accelerator authenticates the identity of the TLS termination point, and determines if the request is authorized. If the decryption request is authorized, the cryptography accelerator retrieves the private cryptographic key associated with the online service and decrypts 710 the premaster secret. At block 712, the cryptography accelerator uses the decoded premaster secret to generate a master secret and session keys for the TLS connection. The master secret and session keys are retained by the cryptography accelerator. In some implementations, the master secret and session keys are retained in secure storage on an HSM. The cryptography accelerator may provide a token or identifier to the TLS termination point. The token or identifier may be used by the TLS termination point to request cryptographic operations utilizing the master secret and session keys.

After generating and sending the premaster secret to the TLS termination point, at block 714, the client computer system generates a master secret and session keys based at least in part on the premaster secret. The client computer system identifies a cipher for use between the client and the TLS termination point, and sends 716 a "change cipher spec" and "client finished" message to the TLS termination point. The TLS termination point receives 718 the "change cipher spec" and "client finished" messages from the client computer system, and responds by sending 720 "change cipher spec" and "server finished" messages to the client computer system. The client computer system receives 722 the "change cipher spec" and "server finished" messages from the TLS termination point, completing the TLS handshake and establishing the connection between the client computer system and the TLS termination point.

Figure 8:
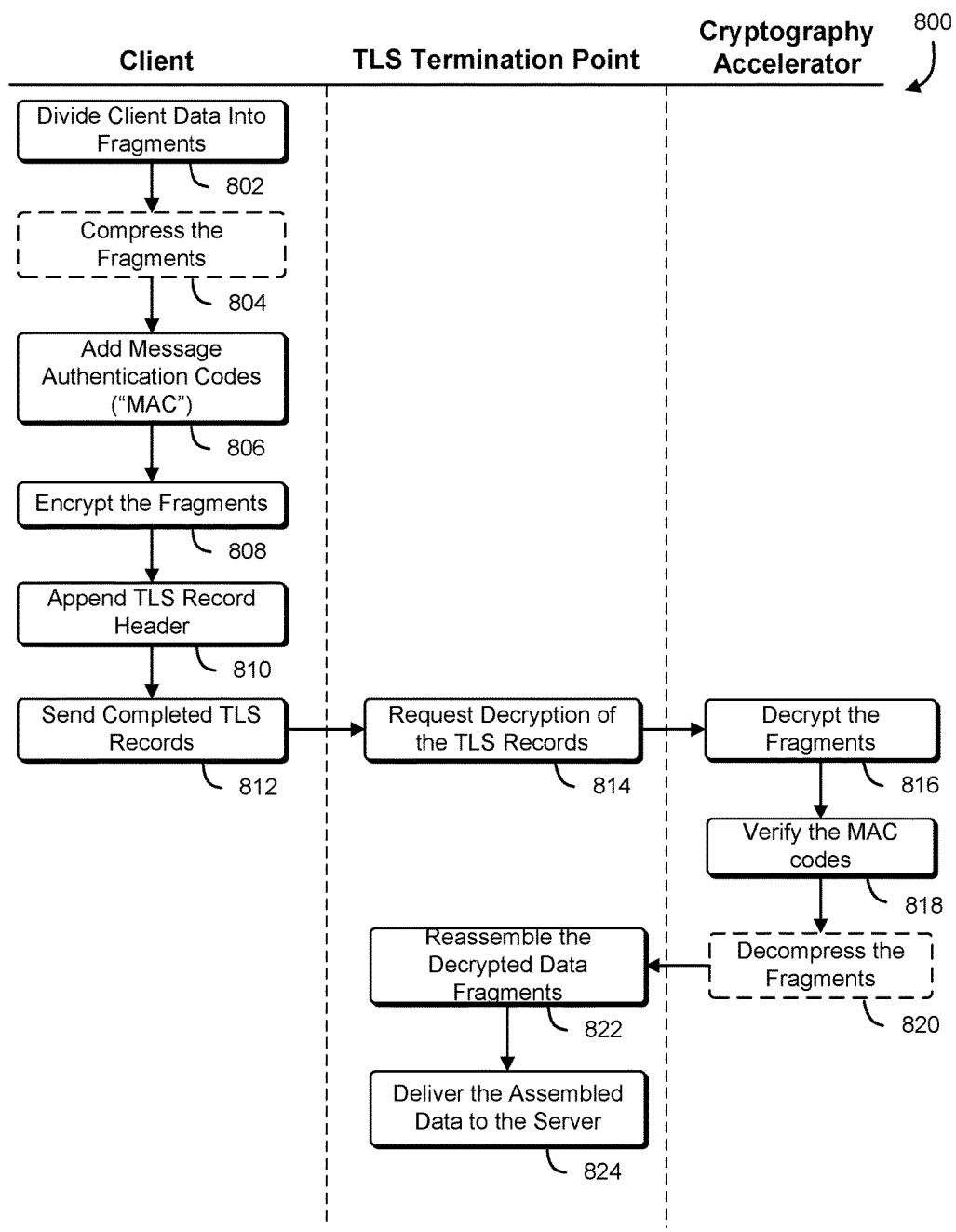
FIG. 8 shows an illustrative example of a process that, as a result of being performed by a client computer system, a TLS termination point, and a cryptographic accelerator, transfers data from the client computer system to a server via a cryptographically protected communication session between the client computer system and the TLS termination point, in accordance with an embodiment.

FIG. 8 shows an illustrative example of a process that, as a result of being performed by a client computer system, a TLS termination point, and a cryptographic accelerator, transfers data from the client computer system to a server via a cryptographically protected communication session between the client computer system and the TLS termination point, in accordance with an embodiment. A swim diagram 800 illustrates a process that begins at block 802 with a client computer system dividing client data into a number of data fragments. In some implementations, the client computer system compresses 804 the data fragments using a lossless compression scheme. At block 806, the client computer system adds message authentication codes to the data fragments. The message authentication codes may help detect violations of data integrity or tampering. Message authentication codes may be based at least in part on cryptographic primitives or block cipher algorithms such as hash-based message authentication codes ("HMAC"), parallelizeable message authentication codes ("PMAC"), or universal message authentication codes ("UMAC").

At block 808, the client computer system encrypts the data fragments using a symmetric key established for the TLS connection during the TLS handshake process. At block 810, the client computer system appends a TLS record header to the data fragments to create a set of completed TLS data records. At block 812, the client computer system sends the completed TLS data records to the TLS termination point. The TLS termination point receives the completed TLS records, and requests 814 decryption of the TLS records by the cryptography accelerator.

At block 816, the cryptography accelerator receives the encrypted TLS records, authenticates the identity of the TLS termination point, and determines whether the decryption request is authorized. If the decryption request is authorized, the cryptography accelerator decrypts the records using the TLS session key, which is retained by the cryptography accelerator. At block 818, the cryptography accelerator cryptographically verifies the MAC codes attached to the decrypted data fragments. If the MAC codes are valid, execution proceeds to block 820 and the cryptography accelerator decompresses the data fragments if they were previously compressed by the client computer system. The resulting plaintext data fragments are provided by the cryptography accelerator to the TLS termination point.

At block 822, the TLS termination point reassembles the plaintext data fragments to recreate a copy of the client data. The client data is transmitted 824 by the TLS termination point to the server that provides the online service.

Server data may be transferred from the server to the client computer system using a corresponding process. In one implementation, the server provides, to the TLS termination point, data which is to be transmitted to the client computer system. The TLS termination point divides the server data into fragments, and provides the fragments to the cryptography accelerator. The cryptography accelerator optionally compresses the data fragments, adds message authentication codes to the data fragments, and encrypts the data fragments using the session key maintained by the cryptography accelerator. The encrypted fragments are returned to the TLS termination point which appends appropriate TLS record headers, and sends the completed TLS records to the client computer system. The client computer system can process the incoming TLS records using computing facilities located on the client computer system, or may utilize a second cryptography accelerator associated with the client computer system.

Figure 9:
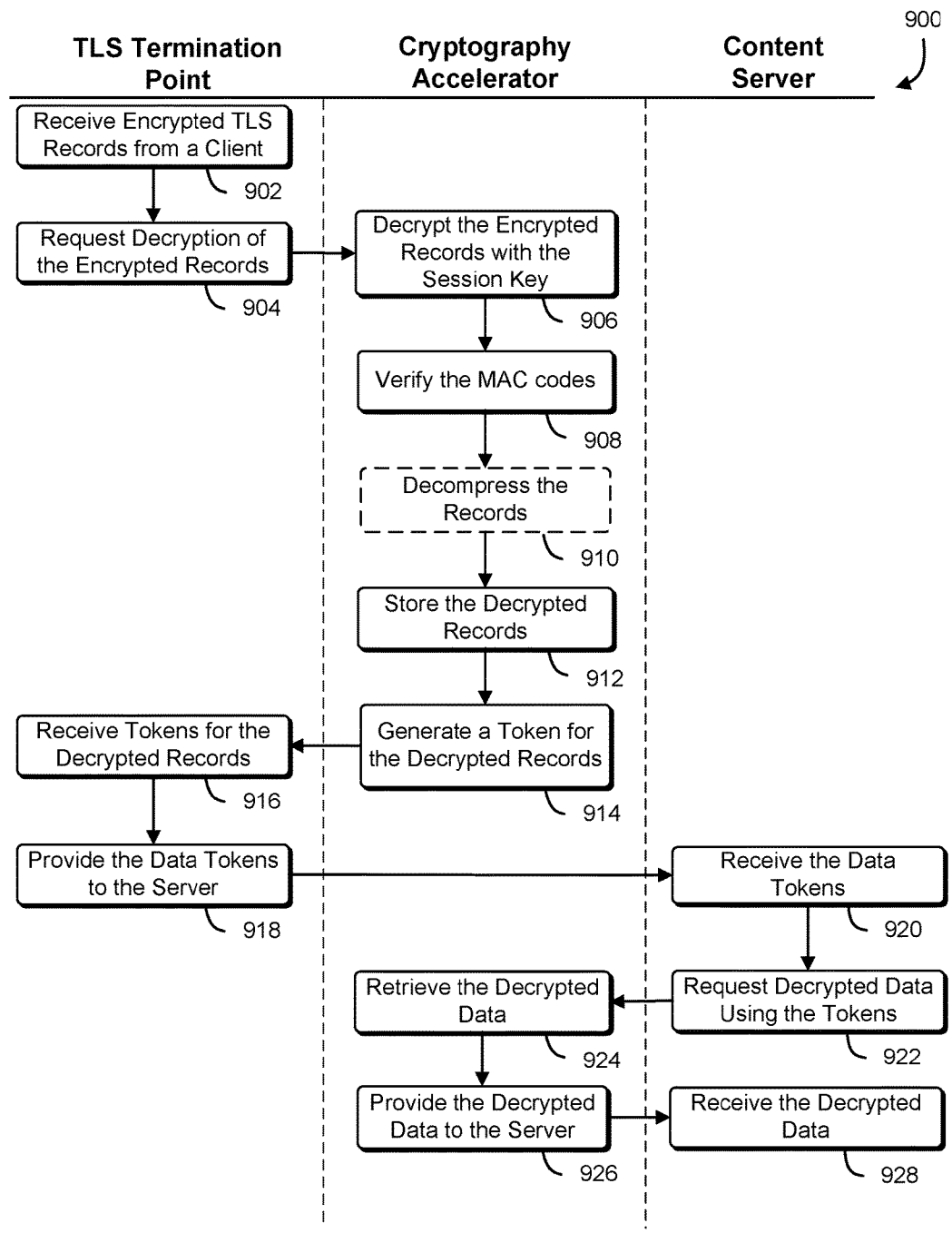
FIG. 9 shows an illustrative example of a process that, as a result of being performed by a TLS termination point, a cryptographic accelerator, and a content server, transfers data from a client computer system to the content server without providing the decrypted client data to the TLS termination point, in accordance with an embodiment.

FIG. 9 shows an illustrative example of a process that, as a result of being performed by a TLS termination point, a cryptographic accelerator, and a content server, transfers data from a client computer system to the content server without providing the decrypted client data to the TLS termination point, in accordance with an embodiment. A swim diagram 900 shows a process that begins at block 902 with a TLS termination point receiving encrypted TLS records from a client computer system. The TLS termination point sends 904, to a cryptography accelerator, a request to decrypt the encrypted TLS records.

The cryptography accelerator receives the encrypted TLS records, authenticates the identity of the TLS termination point, and determines whether the request to decrypt the encrypted TLS records is authorized. If the request to decrypt the encrypted TLS records is authorized, the cryptography accelerator decrypts 906 the encrypted TLS records using the session key for the TLS connection maintained by the cryptography accelerator. At block 908, the cryptography accelerator verifies the message authentication codes associated with the decrypted TLS records. In some implementations, the decrypted TLS records may be compressed. If the decrypted TLS records are compressed, the cryptography accelerator decompresses 910 the compressed TLS records. At block 912, the cryptography accelerator stores the decrypted and decompressed TLS records. The TLS records may be retained by the cryptography accelerator on a storage device directly connected to the cryptography accelerator, or on a storage device connected to the cryptography accelerator but which is inaccessible to the TLS termination point. The cryptography accelerator generates 914 one or more tokens that are associated with the decrypted TLS records, and provides the tokens to the TLS termination point. The cryptography accelerator determines, based at least in part on the content of the TLS records, the authorized destination for the decrypted data. The authorized destination is added to an access control list that controls which entities can retrieve the decrypted TLS records using the tokens.

At block 916, the TLS termination point receives the tokens associated with the decrypted TLS records. In general, the TLS termination point does not need to be added to the access control list, and may not access the decrypted TLS records from the cryptography accelerator. At block 918, the TLS termination point provides the tokens to the content server.

The content server receives 920 the data tokens from the TLS termination point and is able to retrieve the decrypted data from the cryptography accelerator. At block 922, the content server requests the decrypted data from the cryptography accelerator by, in part, sending the tokens to the cryptography accelerator. The cryptography accelerator receives the tokens, and confirms that the content server is authorized to access the decrypted data using the access control list. The cryptography accelerator retrieves 924 the decrypted TLS data. At block 926, the cryptography accelerator provides the decrypted TLS data to the content server. The content server, at block 928 receives the decrypted data from the cryptography accelerator. In some implementations, the cryptography accelerator deletes the decrypted data after the content server confirms receipt at block 928.

Figure 10:
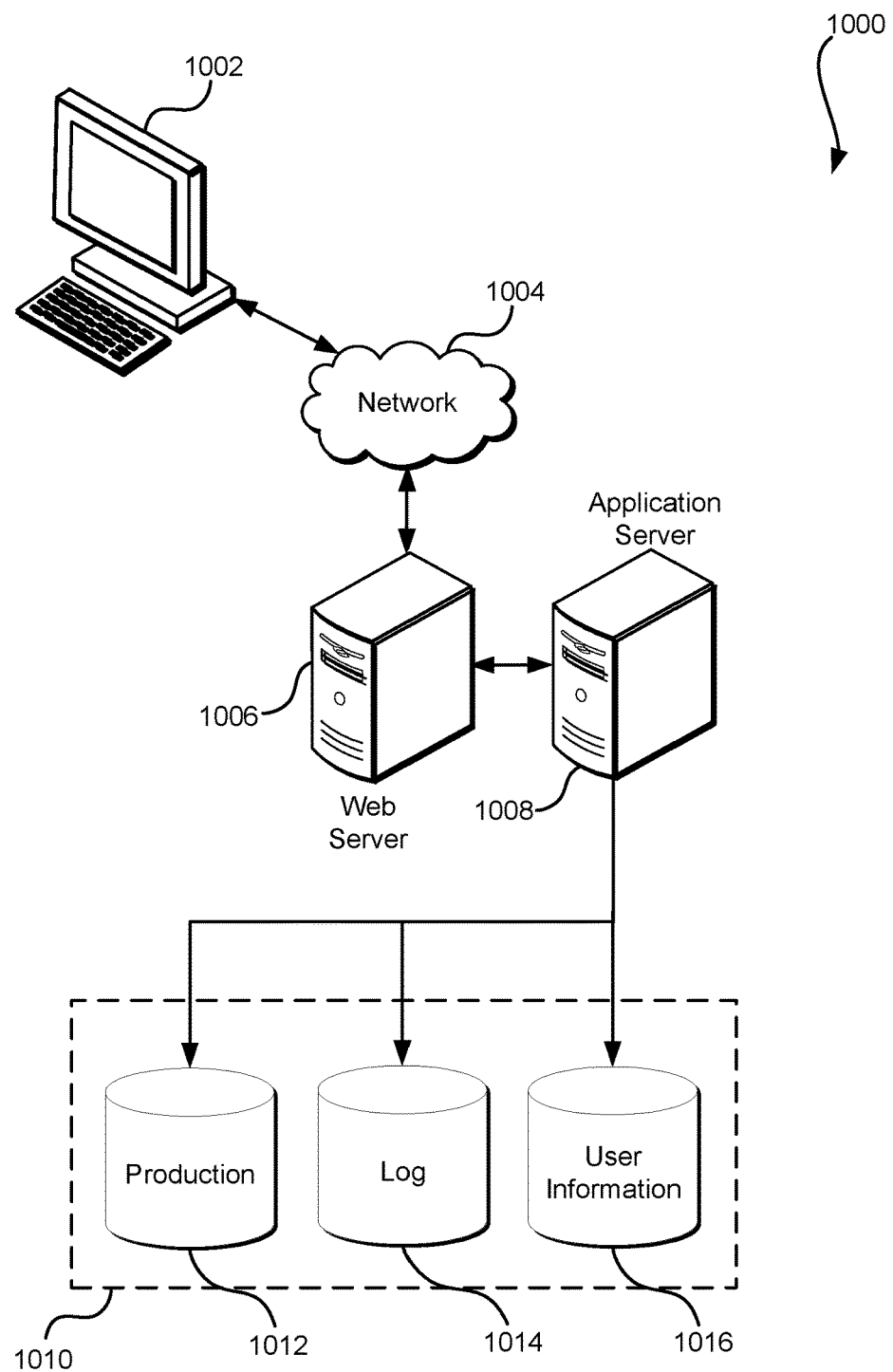
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6066, RFC 6083, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adapatable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4303, and RFC 4309) and other protocols, such as protocols for secure communication that include a handshake.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    obtaining a request to establish a cryptographically protected communication session from a client computer system;
    providing a digital certificate to the client computer system, the digital certificate associated with a service provided by a server computer system;
    obtaining an encrypted premaster secret from the client computer system, the encrypted premaster secret encrypted using a public cryptographic key included with the digital certificate;
    providing, to a cryptographic service that has access to a private cryptographic key associated with the digital certificate, the encrypted premaster secret;
    establishing the cryptographically protected communication session with the client computer system, the cryptographically protected communication session operating in accordance with parameters that are based at least in part on the encrypted premaster secret;
    obtaining a data token from the server computer system, the data token associated with data to be transmitted to the client computer system;
    obtaining encrypted server data from the cryptographic service using the data token, the encrypted server data corresponding to the data to be transmitted to the client computer system, and the encrypted server data encrypted using a cryptoprocessor with a key that is based on the encrypted premaster secret; and
    providing the encrypted server data to the client computer system.

2. The computer-implemented method of claim 1, wherein
    the cryptographic service is provided by the server computer system.

3. The computer-implemented method of claim 1, further comprising:
    obtaining, from the client computer system, an encrypted data record encrypted in accordance with a symmetric cryptographic algorithm;
    submitting, to the cryptographic service, a second request to decrypt the encrypted data record; and
    obtaining, in response to the second request, an unencrypted data record from the cryptographic service.

4. The computer-implemented method of claim 1, further comprising:
    generating a session key for the cryptographically protected communication session, the session key based at least in part on the premaster secret; and
    exchanging encrypted data records with the client computer system, the encrypted data records encrypted with the session key in accordance with a symmetric encryption algorithm.

5. A non-transitory computer-readable storage medium having stored thereon executable instructions that, as a result of being executed by one or more processors of a computer system, cause the computer system to at least:
    request a cryptographic operation be performed by a cryptographic service using a cryptographic key accessible to the cryptographic service;
    establish, on behalf of a server computer system associated with the cryptographic key, an encrypted communication channel between the computer system and a client computer system, a session key of the encrypted communication channel based at least in part on a result of the cryptographic operation;
    exchange encrypted data with the client computer system, the encrypted data encrypted with the session key;
    retrieve, using a data token provided by the server computer system, encrypted server data from the cryptographic service, the encrypted server data encrypted with the session key; and
    transmit the encrypted server data to the client computer system.

6. The non-transitory computer-readable storage medium of claim 5, wherein the instructions further comprise instructions that, as a result of being executed by the one or more processors, cause the computer system to:
    obtain server data from the server computer system;
    request, from the cryptographic service, encryption of the server data with the session key to produce encrypted server data; and
    transmit the encrypted server data to the client computer system.

7. The non-transitory computer-readable storage medium of claim 5, wherein the instructions further comprise instructions that, as a result of being executed by the one or more processors, cause the computer system to:
    provide a public cryptographic key to the client computer system, the public cryptographic key associated with the server computer system;
    obtain an encrypted premaster secret from the client computer system, the encrypted premaster secret encrypted with the public cryptographic key; and
    request decryption of the encrypted premaster secret from the cryptographic service.

8. The non-transitory computer-readable storage medium of claim 7, wherein the public cryptographic key is provided to the client computer system in a digital certificate associated with the server computer system.

9. The non-transitory computer-readable storage medium of claim 5, wherein the instructions further comprise instructions that, as a result of being executed by the one or more processors, cause the computer system to:
    obtain encrypted client data from the client computer system;

request, from the cryptographic service, decryption of the encrypted client data with the session key to produce decrypted client data; and transmit the decrypted client data to the server computer system.

10. The non-transitory computer-readable storage medium of claim 5, wherein the session key is not accessible to the computer system in plaintext form.

11. The non-transitory computer-readable storage medium of claim 5, wherein the instructions further comprise instructions that, as a result of being executed by the one or more processors, cause the computer system to:

obtain encrypted client data from the client computer system;

provide the encrypted client data to the cryptographic service;

obtain, from the cryptographic service, a data token corresponding to the encrypted client data; and transmit the data token to the server computer.

12. The non-transitory computer-readable storage medium of claim 5, wherein the cryptographic key is not accessible to the computer system.

13. A computer system, having a memory storing executable instructions that, as a result of being executed by one or more processors of the computer system, cause the computer system to:

request a cryptographic operation be performed by a cryptographic service using a cryptographic key accessible to the cryptographic service;

establish, using the cryptographic service, on behalf of a server computer system associated with the cryptographic key, an encrypted communication channel between the computer system and a client computer system, a session key of the encrypted communication channel based at least in part on a result of the cryptographic operation; and provide encrypted data to the client computer system, the encrypted data produced by the cryptographic service by encrypting data with a cryptoprocessor and the session key, the data provided to the cryptographic service by the server computer system.

14. The system of claim 13, wherein the cryptographic service:

generates the session key for the encrypted communication channel, the session key based at least in part on the result of the cryptographic operation;

obtains server data from the server computer system;

encrypts the server data with the session key to produce encrypted server data; and provides the encrypted server data to the computer system.

15. The system of claim 13, wherein the cryptographic service:

generates the session key for the encrypted communication channel, the session key based at least in part on the result of the cryptographic operation;

obtains encrypted client data from the computer system;

decrypts the encrypted client data with the session key to produce decrypted client data; and provides the decrypted client data to the computer system.

16. The system of claim 13, wherein the cryptographic service:

generates the session key for the encrypted communication channel, the session key based at least in part on the result of the cryptographic operation;

obtains encrypted client data from the computer system;

decrypts the encrypted client data with the session key to produce decrypted client data;

generates a token which represents the decrypted client data;

provides the token to the computer system;

obtains the token from a server computer system; and as a result of receiving the token from the server computer system, provides the server computer system with the decrypted client data.

17. The system of claim 13, wherein:

a result of the cryptographic operation is a premaster secret; and the premaster secret is used to generate the session key.

18. The system of claim 13, wherein the computer system does not have access to the session key in plaintext form.

19. The system of claim 13, wherein:

the cryptographic key is retained in programmatically unexportable storage by the cryptographic service; and the at least one computing device includes a cryptoprocessor.

20. The system of claim 13, wherein the cryptographic service:

generates the session key for the encrypted communication channel, the session key based at least in part on the result of the cryptographic operation;

obtains encrypted client data from the computer system;

decrypts the encrypted client data with the session key to produce decrypted client data;

generates an access token for the decrypted client data;

obtains the access token from a server computer system;

determines that the server computer system is allowed to access the decrypted client data based at least in part on information contained in the decrypted client data; and provides the server computer system with the decrypted client data.

* * * * *